(12) United States Patent
Fagot-Revurat et al.

(10) Patent No.: US 8,162,534 B2
(45) Date of Patent: Apr. 24, 2012

(54) ELEMENT FOR A VEHICLE CONTACT WITH GROUND, TIRE AND USE OF A MEASURING SYSTEM

(75) Inventors: Lionel Fagot-Revurat, Ussel de Vensat (FR); Pascal Prost, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/792,021

(22) PCT Filed: Dec. 2, 2005

(86) PCT No.: PCT/EP2005/056406
§ 371 (c)(1),
(2), (4) Date: May 29, 2007

(87) PCT Pub. No.: WO2006/058916
PCT Pub. Date: Jun. 8, 2006

(65) Prior Publication Data
US 2008/0089385 A1    Apr. 17, 2008

(30) Foreign Application Priority Data

Dec. 2, 2004 (FR) .................................. 04 12829

(51) Int. Cl.
*G01K 11/00* (2006.01)
(52) U.S. Cl. ....................... 374/117; 374/141
(58) Field of Classification Search ............... 374/117
See application file for complete search history.

(56) References Cited

U.S. PATENT DOCUMENTS

| | | | |
|---|---|---|---|
| 4,922,981 A * | 5/1990 | Pompier | 152/158 |
| 6,921,197 B2 * | 7/2005 | Aubel et al. | 374/141 |
| 2001/0004236 A1 * | 6/2001 | Letkomiller et al. | 340/572.1 |
| 2003/0021330 A1 * | 1/2003 | Aubel et al. | 374/142 |
| 2003/0209064 A1 * | 11/2003 | Adamson et al. | 73/146 |
| 2004/0066287 A1 * | 4/2004 | Breed et al. | 340/442 |
| 2004/0118196 A1 * | 6/2004 | Landes et al. | 73/146 |
| 2004/0216526 A1 * | 11/2004 | Cook et al. | 73/708 |
| 2005/0046584 A1 * | 3/2005 | Breed | 340/825.72 |
| 2005/0073435 A1 * | 4/2005 | Voeller et al. | 340/933 |
| 2005/0210973 A1 * | 9/2005 | Eisenhower et al. | 73/146.5 |
| 2005/0275518 A1 * | 12/2005 | Adamson et al. | 340/447 |
| 2006/0025897 A1 * | 2/2006 | Shostak et al. | 701/1 |
| 2007/0295072 A1 * | 12/2007 | Fagot-Revurat et al. | 73/146 |
| 2008/0156406 A1 * | 7/2008 | Breed | 152/415 |
| 2008/0202657 A1 * | 8/2008 | Hammel | 152/152.1 |

* cited by examiner

*Primary Examiner* — Lisa Caputo
*Assistant Examiner* — Mirellys Jagan
(74) *Attorney, Agent, or Firm* — Cozen O'Connor

(57) ABSTRACT

A ground-contacting component of a vehicle, consisting partly of polymeric compounds, in which at least one wireless temperature measurement system 7 based on surface acoustic wave or bulk acoustic wave technology is embedded in a region of a polymeric compound liable to reach temperatures above 100° C. and/or to be influenced by a surrounding region of a polymeric compound liable to reach temperatures above 100° C. during use of the vehicle. Also disclosed are a tire 1 and the use of a wireless temperature measurement system based on acoustic surface wave or bulk acoustic wave technology.

9 Claims, 3 Drawing Sheets

ELEMENT FOR A VEHICLE CONTACT WITH GROUND, TIRE AND USE OF A MEASURING SYSTEM

RELATED APPLICATION

This is a U.S. National Phase Application under 35 USC 371 of International Application PCT/EP2005/056406, filed on Dec. 2, 2005.

FIELD OF THE INVENTION

The present invention relates to a ground-contacting component of a vehicle, consisting partly of polymeric compounds, and relates more specifically to a tire. The invention also relates to the use of a wireless temperature measurement system in such a ground-contacting component of a vehicle.

The invention relates to ground-contacting components of any type of vehicle, such as an automobile, a motorcycle, a heavy-goods vehicle, an agricultural machine or civil engineering machine.

BACKGROUND OF THE INVENTION

Although not limited to such an application, the invention will be described more particularly with reference to a tire.

The reinforcement armature or reinforcement of the tires is, at the present time—and usually—formed by a stack of one or more plies conventionally denoted by "carcass plies", "crown plies", etc. This way of denoting the reinforcements derives from the manufacturing process, which consists in producing a series of semifinished products in the form of plies, provided with filamentary reinforcing elements that are often longitudinal, which reinforcements are subsequently assembled or stacked so as to build up a tire blank. The plies are produced flat, with large dimensions, and are subsequently cut according to the dimensions of a given product. The plies are also assembled, firstly, substantially flat. The blank thus produced undergoes a forming operation so as to adopt the typical toroidal profile of tires. Semifinished products called "finishing products" are then applied to the blank, in order to obtain a product ready for vulcanization.

Such a "conventional" process involves, in particular as regards the phase of producing the tire blank, the use of an anchoring element (generally a bead wire), used for anchoring or retaining the carcass reinforcement in the region of the tire beads. Thus, for this type of process, a portion of all of the plies making up the carcass reinforcement (or only part of it) is upturned around a bead wire placed in the bead of the tire. In this way, the carcass reinforcement is anchored in the bead.

Generalization in the industry using this type of conventional process, despite many variants in the way in which the plies are produced and assembled, has led those skilled in the art to use a vocabulary derived from the process; hence the generally accepted terminology comprising in particular the terms "plies", "carcass", "bead wire", "forming", for denoting the passage from a flat profile to a toroidal profile, etc.

At the present time there are tires that do not comprise, strictly speaking, "plies" or "bead wires" according to the above definitions. For example, document EP 0 582 196 discloses tires produced without using semifinished products in the form of plies. For example, the reinforcing elements for the various reinforcement structures are applied directly to the adjacent layers of rubber compounds, the combination being applied by successive layers on a toroidal core, the shape of which makes it possible to obtain, directly, a profile matching the final profile of the tire being manufactured. Thus, in this case, there are no longer "semifinished products", nor "plies" nor a "bead wire". The base products, such as the rubber compounds and the reinforcing elements in the form of cords or filaments, are applied directly to the core. Since this core has a toroidal shape, there is no longer a forming operation for bringing the blank from a flat profile to a toroidal profile.

Moreover, the tires described in that document do not have a "conventional" upturn of the carcass ply around a bead wire. This type of anchoring is replaced with an arrangement in which circumferential cords are placed adjacent said sidewall reinforcement structure, the combination being embedded in an anchoring or bonding rubber compound.

There are also processes for assembly on a toroidal core using semifinished products suitable for rapid, effective and simple application on a central core. Finally, it is also possible to use a hybrid construction, comprising both certain semifinished products for achieving certain architectural aspects (such as plies, bead wires, etc.), whereas others are produced by directly applying reinforcing elements and/or compounds.

In the present document, so as to take into account recent technological developments both in the manufacturing field and in product design, the conventional terms such as "plies", "bead wires", etc. are advantageously replaced with neutral terms or terms that are independent of the type of process used. Thus, the term "carcass reinforcement" or "sidewall reinforcement" is valid for denoting the reinforcing elements of a carcass ply in the conventional process, and the corresponding reinforcing elements, generally applied in the sidewalls, of a tire produced using a process without semifinished products. For its part, the term "anchoring region" may denote both the "conventional" carcass ply upturn around a bead wire of a conventional process and the assembly formed by the circumferential reinforcing elements, the rubber compound and the adjacent sidewall reinforcement portions of a base region produced using a process with application on a toroidal core.

The longitudinal direction, or circumferential direction, of the tire is the direction corresponding to the periphery of the tire and is defined by the run direction of the tire.

A circumferential plane or circumferential sectional plane is a plane perpendicular to the rotation axis of the tire. The equatorial plane is the circumferential plane passing through the centre or top of the tread.

The transverse or axial direction of the tire is parallel to the rotation axis of the tire.

A radial plane contains the rotation axis of the tire.

When a vehicle is being used, the rubber compounds forming the various parts of the tire, such as the base regions, the sidewalls and the tread, are subjected to stresses which, combined with the material properties, result in the compounds rising in temperature.

It is known to those skilled in the art that the physicochemical properties of rubber compounds vary with temperature, and therefore that the temperature has an influence on the properties of the various rubber compounds of the tire.

Thus, depending on the type of tire and its use, certain regions of the tire are subjected to stresses such that the temperatures reached may result in non-optimal performance of the tire, for example in terms of endurance or wear.

Moreover, it is known, for example from document EP 1 275 949, to implant a wireless sensor in tires so as to determine forces or stresses exerted within the tire.

Document EP 0 937 615 discloses the use of wireless surface acoustic wave sensors incorporated into a tire, especially for measuring the grip of a tire. Such a sensor has the advantage of being able to be remotely interrogated wirelessly, by radio waves, without a nearby energy source being necessary. The energy of the interrogating radio wave sent by a remote interrogation device is sufficient for the sensor to transmit a modified radio wave in response.

SUMMARY OF THE INVENTION

The One object of the invention is to provide a ground-contacting component of a vehicle, such as a tire, capable of communicating with an interrogation device attached to the vehicle, in order to indicate a local temperature variation of part of a polymeric compound of the ground-contacting component liable to result in a pertinent change in the performance of said component and thus help the driver of the vehicle to adapt his driving to the conditions of the tire and thus to optimize its performance.

This object has been achieved according to the invention by a ground-contacting component of a vehicle, consisting partly of polymeric compounds, at least one wireless temperature measurement system based on surface acoustic wave or bulk acoustic wave technology being embedded in a region of a polymeric compound liable to reach temperatures above 100° C. and/or to be influenced by a surrounding region of a polymeric compound liable to reach temperatures above 100° C. during use of the vehicle.

Within the meaning of the invention, the use of the vehicle takes place in an ambient temperature of around 20° C.

According to the invention, the region in which at least one wireless temperature measurement system based on surface acoustic wave or bulk acoustic wave technology is embedded and/or near said region may reach a temperature above 100° C. under conditions that may depart from nominal usage conditions. This may be, for example, the region of a ground-contacting component reaching such temperatures in the event of being over-stressed (i.e. stressed beyond the recommended nominal conditions) by one or more parameters to which said component is subjected, such as, for example, in the case of a tire, the speed, the load or the pressure.

For example, underinflation of a tire, that is to say to a pressure below the nominal pressure, of a passenger vehicle may result, when being driven, in the shoulders of the tire, that is to say the axially outer ends of the tread, overheating. The temperature measurement system is therefore advantageously placed in this region.

According to another example, overinflation of a tire, that is to say to a pressure above the nominal pressure, of a passenger vehicle or heavy-goods vehicle may result, when being driven, in the crown of the tire, that is to say the central part of the tread, overheating. The temperature measurement system is therefore advantageously placed in this region.

The measurement system is placed in a region surrounding or near the region liable to reach temperatures above 100° C. as long as the person skilled in the art knows how to determine a transfer function of the temperature between these two regions, the measurement of the temperature in one of the regions being directly correlated to that in the other region. These two regions are therefore very close together. Such a construction is especially beneficial when the region in question may reach relatively high temperatures and/or be subjected to high mechanical stresses liable to damage the measurement system.

According to a preferred embodiment of the invention, the temperature measurement system is embedded in a region of a polymeric compound liable to reach temperatures above 110° C., more preferably above 150° C., during use of the vehicle.

It has been demonstrated during trials that the wireless temperature measurement systems based on SAW (surface acoustic wave) or BAW (bulk acoustic wave) technology permit a precise measurement of the local temperature to be obtained, that is to say a measurement of the temperature of the polymeric compound, directly in the vicinity of said systems.

SAW or BAW sensors also have the advantage, as mentioned above, of being able to be remotely interrogated by radio waves, without a nearby energy source being necessary.

These sensors furthermore permit frequent high-speed measurements and thus provide frequent and rapid information about the state of the polymeric compounds. They are thus particularly well suited for measuring the temperature of rubber compounds which, when they are subjected to high stresses or stresses for a long duration, see their temperature increase, slowly at first but then much more rapidly in the form of a thermal runaway.

Another advantage of these sensors is due especially to their small dimensions which permit them to be placed in the abovementioned regions without disturbing the intrinsic operation of the tire.

According to a first embodiment of the invention, the component, which is a constituent of a mounted assembly comprising a wheel and a tire, is part of the wheel.

According to a second embodiment of the invention, the component, which is a constituent of a mounted assembly comprising a wheel and a tire, is part of the tire. The component is then advantageously inserted into a rubber compound constituting the tire. Depending on the use of this tire, or more precisely the vehicle for which it is intended, the component will be embedded in a rubber mass of the tread, of a sidewall or base region.

According to a third embodiment of the invention, the component, which is a constituent of a mounted assembly comprising a wheel, a tire and a support member for supporting the tire in particular for use in degraded mode, is part of the support member.

Such a support member is for example a bearing surface on which the tire rests in the event of loss of pressure; such a bearing surface is, for example, described in document EP 0 314 988. It may also be a foam core, such as the product sold under the trademark "Bib Mousse" by Michelin. Such a component fills the cavity of the mounted assembly. It is used in particular for rallying competition vehicles. Knowing the temperature in predetermined regions of these components may provide information either about the state of the mounted assembly or about the state of the component itself.

Whatever the type of ground-compacting component in question, the measured temperature information is transmitted by radio waves to an interrogation device, for example one fastened to the vehicle, in order to provide the driver of the vehicle with indications. These indications available to the driver allow him to adapt the way he is driving the vehicle so as to limit the observed overheating and bring the ground-contacting component back to acceptable temperatures for maintaining its performance.

According to an alternative embodiment of the invention in which at least two wireless temperature measurement systems based on surface acoustic wave or bulk acoustic wave technology comprising linearly polarized antennas are embedded in regions of two polymeric compounds liable to reach temperatures above 100° C. and/or to be influenced by regions of surrounding polymeric compounds liable to reach temperatures above 100° C. during use of the vehicle, the polarization directions of the antennas make between them an angle between 30 and 90°.

The trials carried out have demonstrated that communication between an interrogation device, for example one associated with the vehicle, and each of the measurement systems, especially in the case of sensors of the SAW or BAW resonator type, requires an orientation corresponding to one or other of the antennas of the measurement systems so as to communicate with each of them. Such an embodiment according to the invention will thus make it possible to receive signals retransmitted by each of the measurement systems, using either two interrogation devices or a single interrogation device designed to receive signals retransmitted by antennas whose polarization directions are different and thus allowing the measurement system to be selected. Such an embodiment therefore enables the temperature in a defined region to be known in the case of two measurement systems placed in different regions. This is because a person skilled in the art knows that it is not possible to select a sensor of the SAW or BAW resonator type on the basis of the signal that it retransmits.

The invention also provides a tire comprising at least one carcass reinforcement structure formed from reinforcing elements and anchored on each side of the tire to a bead, the base of which is intended to be mounted on a rim seat, each bead being radially outwardly extended by a sidewall, the sidewalls radially outwardly joining a tread, the beads, the sidewalls and the tread consisting partly of rubber compounds, at least one wireless temperature measurement system based on surface acoustic wave or bulk acoustic wave technology being embedded in a region of a rubber compound liable to reach temperatures above 100° C. and/or to be influenced by a surrounding region of a rubber compound liable to reach temperatures above 100° C. during use of the vehicle.

According to a preferred embodiment of the invention, the temperature measurement system is embedded in a region of a rubber compound liable to reach temperatures above 110° C., and more preferably above 150° C., during use of the vehicle, and/or to be influenced by a surrounding region of a rubber compound liable to reach such temperatures.

According to a first embodiment of the tire according to the invention, the measurement system is embedded in a part of the tread. Depending on the type of vehicle for which the tire is intended, various regions of the tread may be monitored. For example, in the case of a motorcycle, it may in particular be useful to take a temperature measurement on the crown of the tire, that is to say, in the equatorial plane of the tire. The reason for this is that the tread region may, for example, be highly stressed during traveling at high speeds in a straight line for a long time. In another example, which is that of heavy-goods vehicles, the measurement system may, for example, be embedded in part of the axially outer ends of the tread, this region also being called the shoulder of the tire. A person skilled in the art knows in fact that the shoulders of a tire are subjected to stresses that may result in overheating of rubber compounds.

In a second embodiment of the tire according to the invention, the measurement system is embedded in a part of a sidewall. Measuring the temperature in a region of the sidewall may in particular provide important information in the case of civil engineering vehicles exposed to large bending forces when running, which stress certain regions of the sidewalls.

In a third embodiment of the tire according to the invention, the measurement system is embedded in a part of a bead. Such an application may be particularly useful in the case of agricultural vehicles, in particular owing to the large bending forces to which these tires are subjected.

According to an alternative embodiment of the invention in which at least two wireless temperature measurement systems based on surface acoustic wave or bulk acoustic wave technology comprising the linearly polarized antennas and being embedded in two regions of rubber compounds liable to reach temperatures above 100° C. and/or to be influenced by regions of surrounding rubber compounds liable to reach temperatures above 100° C. during use of the vehicle, the polarization directions of the antennas form between them an angle between 30 and 90°.

As indicated above, such an embodiment allows the measurement system communicating with the interrogation device, for example associated with the vehicle, to be selected in the case of two systems incorporated in different rubber compound regions.

Such an embodiment of a tire according to the invention may be particularly beneficial in the case of a vehicle of the motorcycle type equipped with tires made with a high degree of curvature, usually greater than 0.2, being used with cambered wheels. The stresses exerted, for example in the equatorial plane of the tread and in the axially outer parts of the tread, are not the same, therefore, since they are under different conditions. This is because, depending on the use of the motorcycle, either running in a straight line or around a curve, that part of the tread in contact with the ground is not the same and is not stressed in the same way. Placing temperature sensors in the various corresponding regions, according to this embodiment of the invention in which the polarization directions of the antennas make between them an angle between 30° and 90°, enables these various regions to be continuously monitored.

The tire thus proposed according to the invention incorporates at least one wireless measurement system based on surface acoustic wave or bulk acoustic wave technology for measuring the temperature of a region of a constituent rubber compound of the tire. The measurement system according to the invention is placed in a precise region so as to carry out a local temperature measurement, said region being known to be liable to reach a temperature above 100° C. and/or to be influenced by a surrounding region liable to reach temperatures above 100° C.

To make it easier to install the temperature measurement system(s), the tire according to the invention is advantageously produced using a manufacturing technique of the type on a hard core or rigid former, as mentioned above.

Such a tire which, as mentioned above, is advantageously produced using a technique of the type on a hard or toroidal core, in particular permits the temperature measurement systems to be placed in a virtually final position, a shaping step not being required using this type of process, it being possible for said final position also to be completely identified. Indeed, the manufacture of the type on a hard core may allow a temperature measurement system to be inserted with predetermined indexation.

The invention also provides a use of a wireless temperature measurement system based on surface acoustic wave or bulk acoustic wave technology, embedded in a region of the polymeric compound of a ground-contacting component of a vehicle, for the local measurement of a temperature, said region being liable to reach temperatures above 100° C. and/or to be influenced by a surrounding region of a polymeric compound liable to reach temperatures above 100° C. when the vehicle is being used.

According to a preferred embodiment of the invention, the temperature measurement system is embedded in a region of a polymeric compound liable to reach temperatures above 110° C., and more preferably above 150° C., during use of the vehicle, and/or to be influenced by a surrounding region of a polymeric compound liable to reach such temperatures.

According to an advantageous embodiment of the invention, the measurement system is used by having said system embedded in the polymeric compound of a mounted assembly.

According to a first embodiment of this variant of the invention, the mounted assembly comprising a wheel and a tire, the measurement system is used by having said system embedded in the polymeric compound of a part of the wheel.

According to a second embodiment of this variant of the invention, the mounted assembly comprising a wheel and a tire, the measurement system is used by having said measurement system embedded in the rubber compound of a part of the tire.

According to a third embodiment of this variant of the invention, the mounted assembly comprising a wheel, a tire and a support member for supporting the tire in particular for use in degraded mode, the measurement system is used by having said measurement system embedded in the polymeric compound of the support member.

BRIEF DESCRIPTION OF THE DRAWINGS

Further details and advantageous features of the invention will become apparent from the following description of exemplary embodiments of the invention with reference to FIGS. 1 to 3, which show.

DETAILED DESCRIPTION OF THE DRAWINGS

Figure 1:
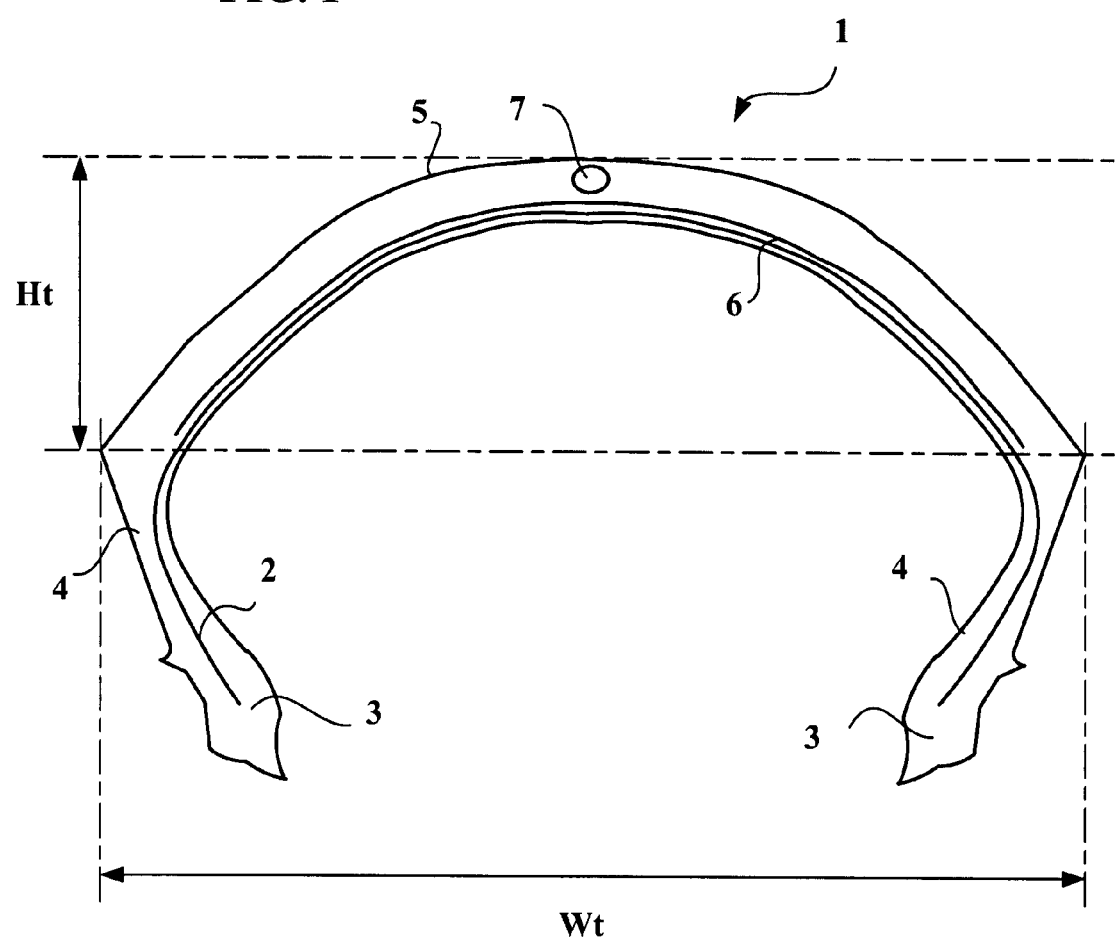
FIG. 1, a meridianal view of a diagram of a tire according to a first embodiment of the invention.
Figure 2:
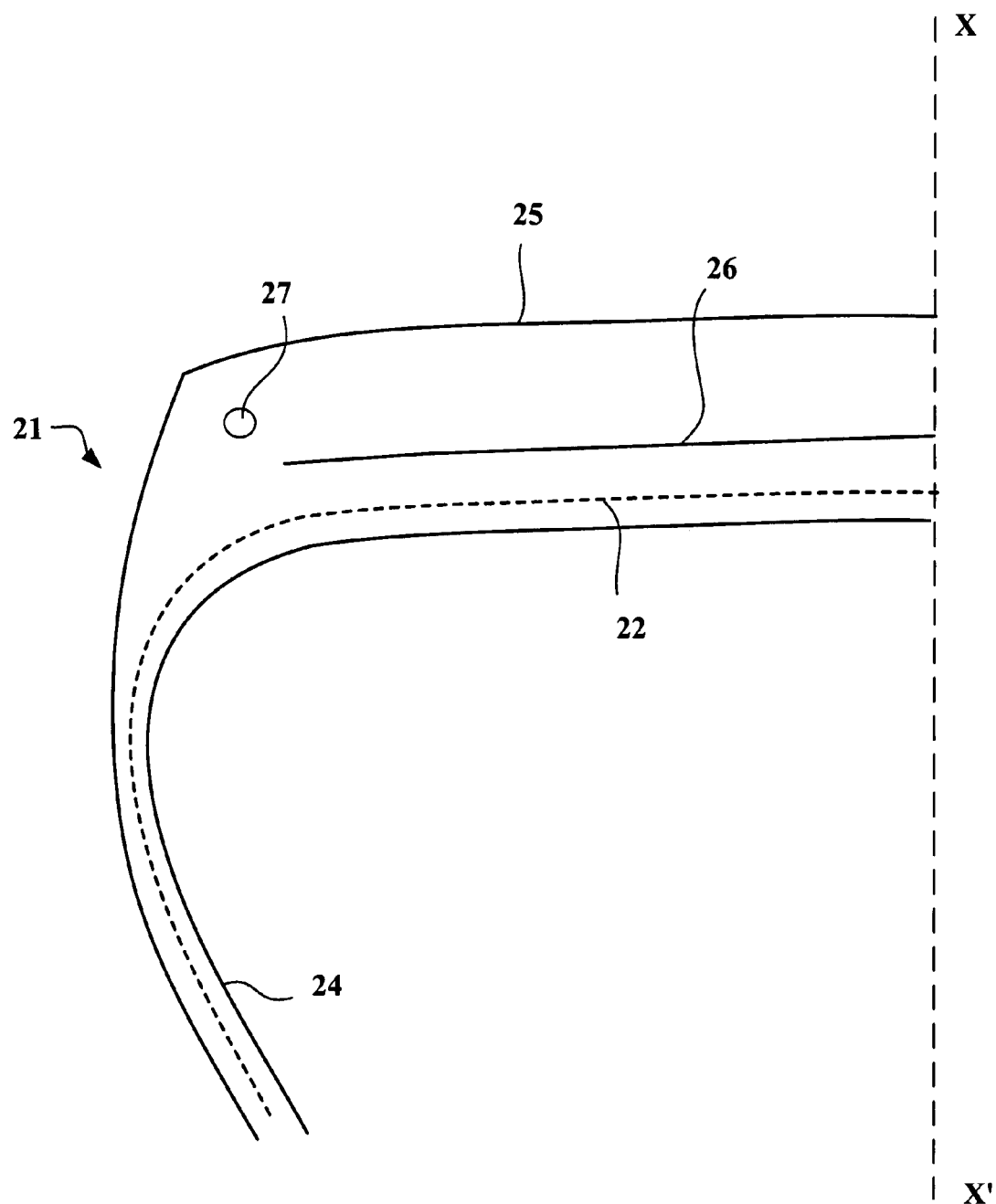
FIG. 2, a meridianal view of a diagram of a tire according to a second embodiment of the invention.
Figure 3:
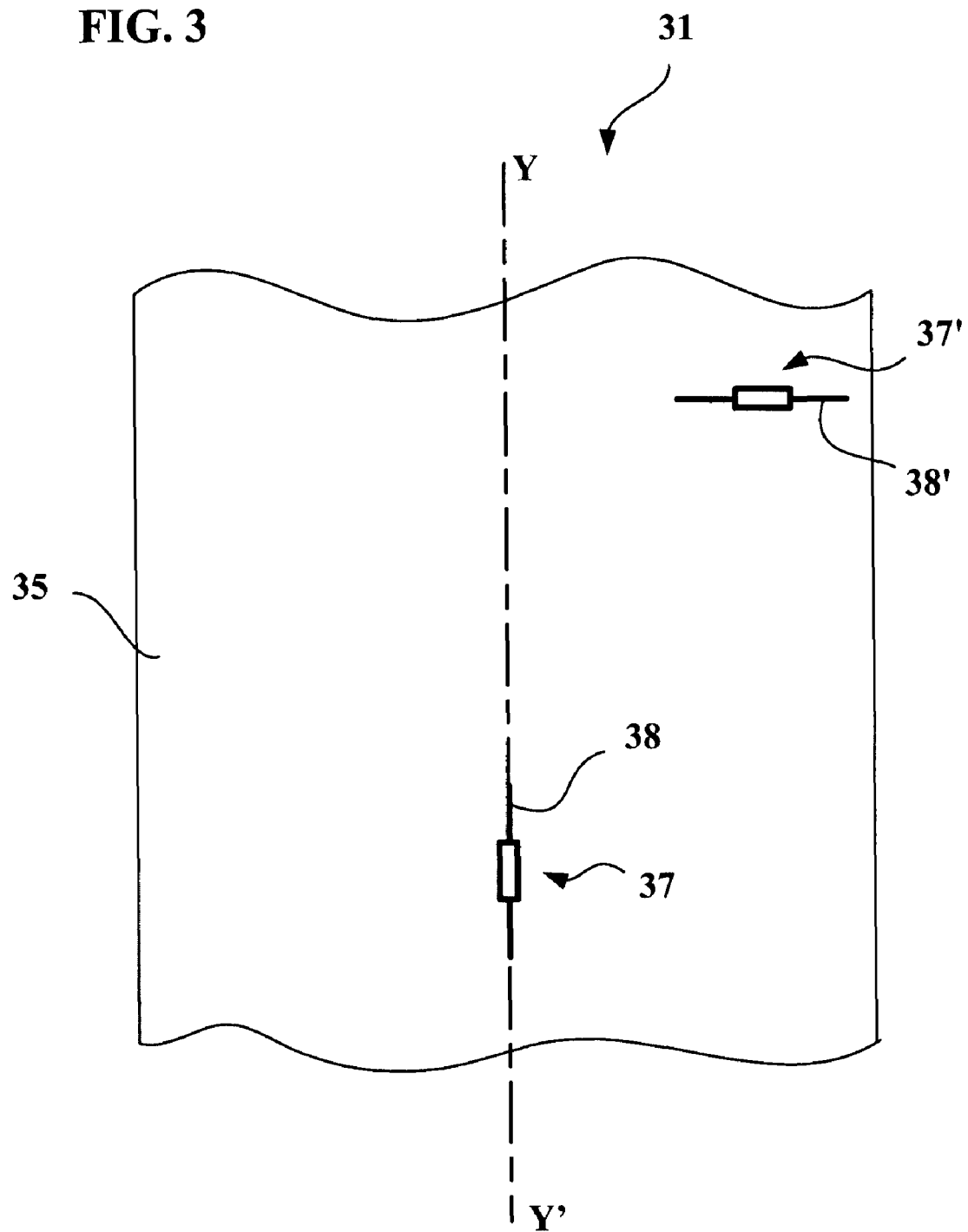
FIG. 3, a sketch in plan view of the tread of a tire.

FIGS. 1 to 3 have not been drawn to scale so as to make them easier to understand.

FIG. 1 shows a tire 1 designed to be used on a vehicle of the motorcycle type, comprising a carcass reinforcement consisting of a single ply 2, comprising reinforcing elements of the textile type. The ply 2 consists of reinforcing elements positioned radially. The radial positioning of the reinforcing elements is defined by the lay angle of said reinforcing elements. A radial arrangement corresponds to a lay angle of said elements of between 65° and 90° to the longitudinal direction of the tire.

Said carcass ply 2 is anchored on each side of the tire 1 in a bead 3, the base of which is intended to be mounted on a rim seat. Each bead 3 is radially outwardly extended by a sidewall 4, said sidewall 4 radially outwardly joining a tread 5. The tire 1 thus formed has a curvature value of greater than 0.15 and preferably greater than 0.3. The curvature value is defined by the Ht/Wt ratio, that is to say the ratio of the height of the tread to the maximum width of the tread of the tire. The curvature value will advantageously be between 0.25 and 0.5 for a tire intended to be mounted at the front of a motorcycle and will advantageously be between 0.2 and 0.5 for a tire intended to be mounted at the rear.

The tire 1 also includes a crown reinforcement 6, the details of which have not been shown in the figure. The crown reinforcement may comprise at least one ply of reinforcing elements that are mutually parallel and make acute angles to the circumferential direction and/or a ply of circumferential reinforcing elements. In the case of the crown ply of a tire comprising at least two plies of reinforcing elements making acute angles to the circumferential direction, said reinforcing elements are crossed from one ply to the next, making angles of between 40 and 100° between them.

According to the invention, the tire includes a measurement system 7 for measuring the internal temperature of the rubber compound of the tread 5. This measurement system 7 is a wireless temperature sensor of the SAW (surface acoustic wave) resonator type. This type of sensor has the advantage, as explained above, of not requiring an associated power supply. It measures the temperature of the rubber compound that surrounds it by modifying a wave that it receives and retransmits.

In the case of FIG. 1, the sensor is placed in the equatorial plane of the tire and provides information about the local temperature of the rubber compound, that is to say the temperature of the rubber compound directly in contact with the sensor. By placing the sensor in this region, the rider of the motorcycle can monitor, or be informed about, the temperature of a region liable to undergo thermal runaway, especially when running at high speed in a straight line.

An interrogator device is advantageously provided on the vehicle for communicating with the sensor. Said interrogator device may then analyze the signal and transmit information to the driver or rider or possibly act directly on the vehicle. Said device may, for example, be designed to send a warning signal before a thermal runaway situation arises in view of the rise in temperature in the region in question of the rubber compound of the tread.

FIG. 2 illustrates a second embodiment of the invention more particularly designed for the case of a heavy goods vehicle. FIG. 2 shows only part of a half-tire 21, which extends symmetrically with respect to the axis XX' representing the circumferential mid-plane, or equatorial plane, of a tire. The bottom regions and beads of the tire 21 in particular have not been shown in this figure. A carcass ply 22, a sidewall 24, a tread 25, a crown reinforcement 26, and a measurement system 27 of the half-tire 21 may, for example, correspond to the carcass ply 2, the sidewall 4, the tread 5, the crown reinforcement 26, and the measurement system 7 of the tire 1 of FIG. 1.

In this FIG. 2, the SAW resonator sensor is chosen to be embedded in a region of the tread rubber compound located at the axially external end of said tread, usually called the shoulder of the tire. This is because those skilled in the art know that this type of tire, especially when subjected to large loads, is forced to experience stresses which, under extreme conditions, may result in thermal runaway of this region of the tread.

FIGS. 1 and 2 show merely a single temperature measurement system within a tire. According to other embodiments of the invention, at least two temperature measurement systems may be provided, distributed within two constituent rubber compound regions of the tire.

FIG. 3 is a sketch in plan view of the tread 35 of a motorcycle tire 31 in which at least two measurement sensors 37, 37' are embedded in rubber compounds of a tire. This FIG. 3 may, for example, be a representation of a motorcycle tire.

A first temperature measurement sensor 37, of SAW resonator type, is placed in the region of the equatorial plane YY' of the tire 31 and, as explained in the case of FIG. 1, provides information regarding the internal temperature of that part of the tread 35 in contact with the ground when the motorcycle follows a straight line.

A second temperature measurement sensor 37', of SAW resonator type, is placed in an axially outer part of the tread 35 of the tire 31 and provides information as regards the internal temperature of said axially outer part of the tread 35 which is in contact with the ground when the motorcycle follows a curved path, the tire 31 then being used with cambered wheels.

The temperature-relative information measured in the tread by each of the SAW resonator sensors is transmitted to an interrogation system, for example one attached to the vehicle. As was already mentioned above, the signals transmitted by the SAW or BAW resonator sensors do not allow the sensor to be selected. According to the representation shown in FIG. 3, the polarization directions of the antennas 38 and 38' of each of the sensors 37, 37' make between them an angle of approximately 90°. These different orientations of the antennas require that provision be made of complex transmit/receive systems within the device provided on the vehicle for communicating with each of the SAW resonator sensors implanted in the tire. This is because the signals from each of the sensors can be received only by satisfactory electromagnetic coupling for each of these signals retransmitted by each sensor with a suitable interrogation device.

The invention claimed is:

1. A ground-contacting component of a vehicle, comprising polymeric compounds, wherein at least one wireless temperature measurement system based on surface acoustic wave or bulk acoustic wave technology is embedded in a region of a polymeric compound of the polymeric compounds, the region of the polymeric compound at least one of reaching temperatures above 100° C. and influenced by a surrounding region of a polymeric compound reaching temperatures above 100° C. during use of the vehicle, and
wherein the at least one wireless temperature measurement system comprises at least two wireless temperature measurement systems based on surface acoustic wave or bulk acoustic wave technology, the at least two wireless temperature measurement systems comprising linearly polarized antennas and being embedded in regions of two polymeric compounds, the regions of the two polymeric compounds at least one of reaching temperatures above 100° C. and influenced by regions of surrounding polymeric compounds reaching temperatures above 100° C. during use of the vehicle, and an angle between 30° and 90° is between the polarization directions of the antennas.

2. The ground-contacting component of a vehicle as claimed in claim 1, wherein the ground-contacting component is included in a mounted assembly comprising a wheel and a tire, and the ground-contacting component is part of the wheel.

3. The ground-contacting component of a vehicle as claimed in claim 1, wherein the ground-contacting component is included in a mounted assembly comprising a wheel and a tire, and the ground-contacting component is part of the tire.

4. The ground-contacting component of a vehicle as claimed in claim 1, wherein the ground-contacting component is included in a mounted assembly comprising a wheel, a tire and a support member for supporting the tire for use in a degraded mode, and the ground-contacting component is part of the support member.

5. A tire comprising at least one carcass reinforcement structure formed from reinforcing elements and anchored on each side of the tire to a bead, the base of which is mounted on a rim seat, each bead radially outwardly extended by a sidewall, the sidewalls radially outwardly joining a tread, the beads, the sidewalls and the tread comprising rubber compounds, wherein at least one wireless temperature measurement system based on surface acoustic wave or bulk acoustic wave technology is embedded in a region of a rubber compound of the rubber compounds, the region of the rubber compound at least one of reaching temperatures above 100° C. and influenced by a surrounding region of a rubber compound reaching temperatures above 100° C. during use of the vehicle, and
wherein the at least one wireless temperature measurement system comprises at least two wireless temperature measurement systems based on surface acoustic wave or bulk acoustic wave technology, the at least two wireless temperature measurement systems comprising linearly polarized antennas and being embedded in two regions of rubber compounds, the two regions of the rubber compounds at least one of reaching temperatures above 100° C. and influenced by regions of surrounding rubber compounds reaching temperatures above 100° C. during use of the vehicle, and an angle between 30° and 90° is between the polarization directions of the antennas.

6. The tire as claimed in claim 5, wherein at least one of the measurement systems is embedded in a part of a sidewall.

7. The tire as claimed in claim 5, wherein at least one of the measurement systems is embedded in a part of a bead.

8. The tire as claimed in claim 5, wherein at least one of the measurement systems is embedded in a part of the tread.

9. The tire as claimed in claim 8, wherein at least one of the measurement systems is embedded in a part of the axially outer ends of the tread.

* * * * *